Jan. 30, 1962 P. H. HOUSER 3,019,380
ELECTRO-PNEUMATIC SEQUENCE CONTROL SYSTEM
Filed Aug. 25, 1960
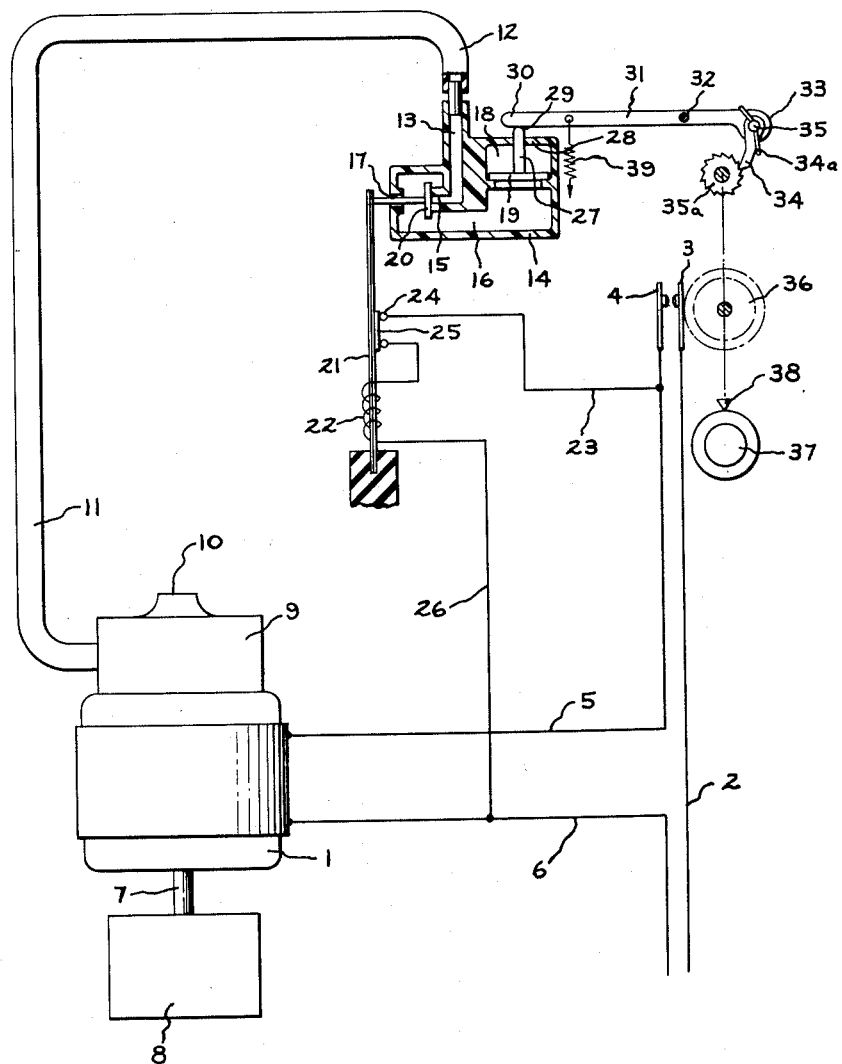
INVENTOR.
PHILIP H. HOUSER
BY Derek P Lawrence
HIS ATTORNEY

United States Patent Office 3,019,380
Patented Jan. 30, 1962

3,019,380
ELECTRO-PNEUMATIC SEQUENCE CONTROL SYSTEM
Philip H. Houser, Louisville, Ky., assignor to General Electric Company, a corporation of New York
Filed Aug. 25, 1960, Ser. No. 51,840
3 Claims. (Cl. 318—486)

This invention relates to sequence control mechanisms, and more particularly to a sequence control system of the type which is electro-pneumatically operated.

It is an object of my invention to provide an electro-pneumatically operated sequence control system.

More particularly, it is an object of my invention to provide such a system where an effective step-advancing force for the control mechanism is applied intermittently by the intermittent opening and closing of a vent in the pneumatic system.

A further more specific object of the invention is to achieve the intermittent opening and closing of the vent in such a system by the use of a bimetallic element which alternately provides a heating circuit for itself and then breaks the heating circuit, and in so doing provides the alternating opening and closing of the vent.

In one aspect of my invention, I provide a step-by-step sequence control mechanism in which a ratchet and pawl arrangement may be used to drive the cam means conventionally provided in such mechanisms, the pawl being secured to a movable member so that it engages and advances the ratchet when the member is moved from a first position to a second position. The member carrying the pawl is biased to one of the aforesaid positions, and in order to move the member to the other position I provide a source of fluid under pressure which is connected to a cylinder and piston arrangement. A vent is provided for the fluid so as to prevent pressure build-up in the cylinder when the vent is open; the vent is alternately opened and closed by any suitable means, preferably by a bimetal which alternately completes and breaks a heating circuit for itself at the same time that it is opening and closing the vent.

The piston has suitable means secured to it which engages the member so that, when the piston moves within the cylinder in response to a pressure buildup, it causes the member to move from the position to which the biasing means has moved it to its other position. Thus, when the vent is opened, the biasing means prevails to cause the member to assume one position and when the vent is closed the member is moved to its other position by the p'ston; this results in a step-by-step advance of the cam means by virtue of the intermittent engagement of the pawl with the ratchet.

The features of my invention which I believe to be novel are set forth with particularity in the appended claims. The invention itself, however, both as to organization and method of operation together with further objects and advantages thereof may best be understood by reference to the following detailed description taken in connection with the accompanying drawing.

In the drawing, the single figure is a schematic illustration of the electro-pneumatic sequence control mechanism of my invention.

Referring now to the drawing, there is shown an electric motor 1 which may be energized through a circuit which, from a conductor 2, proceeds through a movable switch contact 3, a stationary switch contact 4, a conductor 5, the motor 1, and a conductor 6; the conductors 2 and 6 are adapted to be connected across a suitable source of power which may, for instance, be the conventional 110 volt source of 60 cycle alternating current power. It will thus be understood that when the aforesaid circuit is completed the motor 1, which may be of the conventional self-starting induction type, starts and through an appropriate shaft 7 operates a load, schematically illustrated at 8, which may assume any one of a variety of forms.

Motor 1 also drives a rotary type air compressor 9 which may, in the conventional manner, be provided with an inlet 10 and a conduit 11 connected to its outlet. At its end 12 remote from compressor 9 conduit 11 is connected to a passageway 13 formed in a member 14; passageway 13 terminates in an opening 15 which communicates with a passageway 16. Passageway 16 extends past a vent opening 17 formed in body 14 to a cylinder 18 in which is positioned a piston 19 reciprocable within the cylinder. It will be understood that the term cylinder is used, in this context, to denote any hollow body of uniform cross section within which a mating piston body is positioned to reciprocate.

Openings 15 and 17 are adapted to be controlled by a valve closure member 20 which is secured at the end of a bimetallic element 21, the element 20 closing opening 15 and uncovering opening 17 in one position, and reversing the relationship in its other position. Arranged in close physical proximity to the bimetallic element 21 by any suitable means such as by wrapping it around the bimetallic element is a resistance heating coil 22. Coil 22 is adapted to be heated through a circuit which, starting at conductor 2, passes through contacts 3 and 4, conductor 23, contact 24, conductor section 25 secured to the bimetallic element 21, the heating coil 22, and a conductor 26 back to conductor 6. The rate at which coil 22 heats is, of course, a function of the power supplied to it, and may be varied or adjusted by any conventional means (not shown).

When the bimetallic element has been heated to a predetermined temperature the top portion of it is caused to snap to the left, as viewed in the figure, so that at the same time member 25 and contact 24 are separated to deenergize the coil 22 and member 20 is moved away from opening 15 and into closing relation with opening 17. The fact that member 20 has been moved away from opening 15 and into closing relation with opening 17 means that no vent is provided for compressed air being passed through conduit 11 from compressor 9 and that therefore the supply of fluid under pressure passes through duct 16 to cylinder 18 and causes the piston 19 to be raised within the cylinder 18.

A second result of the snapping of bimetal element 21 to the left is, as has been stated, the deenergization of the coil 22. Because there is no longer any heat being applied to the bimetal, it starts to cool and after a predetermined period of cooling snaps back to its original position, as shown, at which time the vent 17 is opened and opening 15 is closed, and the member 25 and contact 24 are again in engagement to complete a circuit for coil 22. The opening of vent 17 ensures that even if opening 15 is not securely shut, pressure will not build up in passage 16. In this regard, it will be understood that the structure may be made fully operative even if opening 15 remains open at all times, i.e. the opening and closing of vent 17 is the basic aspect of the matter, with the particular structure shown constituting a preferred embodiment.

A piston arm 27 is secured to piston 19, the arm extending through wall 28 of member 14 so that as the piston 19 moves up and down in the cylinder 18, the piston arm 27 extends a greater or less amount through the wall 28. The outer end 29 of piston arm 27 contacts the end 30 of a member 31 pivotably secured on a pin 32. At the other end 33 of member 31, a pawl 34 is pivotably secured on member 31 by means of a pin 35. The pawl 34 is biased by a spring 34a into engagement with a ratchet 35a which, as schematically indicated, is rigidly secured to a cam 36 so that when the ratchet 35a is moved by pawl 34 the cam 36 is moved to the same extent. Cam 36 controls the movement of contact 3 so that its engagement with contact 4 is under the control of the cam 36. In the conventional manner, it is also appropriate to provide a manually operable dial 37 which is secured to the cam 36 and ratchet 35a so that the cam may be rotated by manual operation of the dial 37 to the desired position as shown by a suitable indicator 38.

Returning to the member 31, the left end thereof is normally biased downwardly by a spring member 39 so that, under the influence of spring 39, when there is no air pressure raising piston 19 in cylinder 18, the member 31 is pulled down by the spring and in turn pushes the piston arm 27 down to force the piston 19 to the position shown.

In operation, the manual control 37 is turned until the cam 36 closes the contacts 3 and 4. In this connection, it will be assumed that the load 8 operated by the motor 1 is of the type which is to be run for a predetermined period of time and then stopped. For instance, in a clothes dryer where a motor is used to effect rotation of a rotatable clothes container, the dial 37 would be used to set a predetermined amount of time of operation of motor 1 so that at the end of that time the rotation of the container would cease.

Once the cam 36 has been moved to a position where contacts 3 and 4 are engaged, the motor is energized through the circuit previously described. The motor therefore operates the compressor 9 which sends air under pressure through conduit 11 and duct 13. At this point, the bimetal is in its right hand position, closing opening 15 and opening vent 17 so that piston 19 is not moved. The engagement of contacts 3 and 4 has also completed a circuit for the heater element 22, and therefore the bimetal element 21 is heated. After a short period, which typically may be on the order of 15 to 90 seconds, it reaches a temperature where it snaps to the left to close vent 17. As a result of the closing of the vent, the pressure within duct 16 and cylinder 18 rises sufficiently to cause piston 19 to rise against the action of spring 39. As the piston rises, it pushes up the left end 30 of member 31. The right end of the member therefore goes down, and as a result the pawl 34 pushes the ratchet member 35a around one step.

The movement of the bimetal also opens the heater circuit, and therefore the bimetal then proceeds to cool until it snaps back to the position shown in the figure, at which point vent 17 is opened again and the heater circuit is completed again. As a result, the pressure decreases in cylinder 18 so that spring 39 forces the end 30 of the member 31 down and therefore also forces down the piston 19. The movement of the member 31 causes the pawl to slip back over a tooth of the ratchet 35a into another notch of the ratchet in readiness for a subsequent stepping operation. When the bimetal heats enough to trip, the vent is closed again, and the sequence is thus repeated with the ratchet 35a thus being moved in step-by-step fashion. Since the cam 36 has been stated to be secured to the ratchet 35a so as to move therewith, it will be seen that after a predetermined length of time, assuming cam 36 be appropriately shaped, a dip in the cam will come into engagement with the movable contact 3 and allow the contact 3 to move away from contact 4. This will deenergize both the motor 1 and the heater 22. In this manner a complete timing operation may be provided by the structure shown.

It will be understood that the essence of my invention lies in the electro-pneumatic means of providing a step-by-step operation and that the motor and compressor structure, which are shown both as the source of compressed air and as the object controlled, constitute neither the only means of providing fluid under pressure nor the only apparatus suitable for control by my sequence control mechanism. However, the precise structure shown does constitute a preferred embodiment inasmuch as the operation of motors frequently needs to be timed for various purposes, and in the present case the operation of the motor itself provides the source of power for the timer by virtue of the air compressor action.

It will further be understood that while a single cam 36 has been shown, more than one cam may be provided, with each cam controlling the completion of some appropriate circuit. Also, while I have shown a spring 39 for effecting the return motion of the member 31, it will be obvious to those skilled in the art that the cylinder and piston arrangement may be made double acting in response to the movement of the bimetal, and that such an arrangement is the direct equivalent of my biasing means in the form of a spring.

Thus, while in accordance with the patent statutes I have described what at present is considered to be the preferred embodiment of my invention, it will be obvious to those skilled in the art that various changes and modifications may be made therein without departing from the invention, and I therefore aim in the appended claims to cover all such changes and modifications as fall within the true spirit and scope of my invention.

What I claim as new and desire to secure by Letters Patent of the United States is:

1. A step-by-step sequence control mechanism comprising: cam means; a ratchet secured in driving relation to said cam means; a pawl engageable with said ratchet; a movable member secured to said pawl, said pawl engaging and advancing said ratchet when said member is moved from a first position to a second position; means biasing said member to one of said positions; and means for alternately moving said member to the other of said positions and allowing said biasing means to return said member to said one position comprising a source of fluid under pressure, a cylinder, a conduit connecting said source and said cylinder, a vent for said fluid positioned to prevent pressure buildup in said cylinder when said vent is opened, means alternately opening and closing said vent, a piston in said cylinder, and means secured to said piston engaging said member, said piston moving from a first position to a second position in response to a buildup of pressure in said cylinder, said piston in its said second position causing said member to move to its said other position, said biasing means moving said member to its said one position and said member moving said piston back to its said first position when said vent is opened, said means alternately opening and closing said vent comprising a bimetal element having a first position in which it causes said vent to be closed and a second position in which it causes said vent to be opened, said bimetal element completing a heating circuit for itself in one of said positions and opening said heating circuit in the other of its positions.

2. A step-by-step sequence control mechanism for an electric motor comprising: an energizing circuit for said motor; switch means controlling said energizing circuit; cam means controlling said switch means; a ratchet secured in driving relation to said cam means; a pawl engageable with said ratchet; a movable member secured to said pawl, said pawl engaging and advancing said ratchet when said member is moved from a first position to a second position; means biasing said member to one of said positions; and means for alternately moving said member to the other of said positions and allowing said biasing means to return said member to said one position comprising an air compressor secured to said motor to be operated thereby, a cylinder, a conduit connecting said compressor and said cylinder, air vent positioned to prevent pressure buildup in said cylinder when said vent is open, means alternately opening and closing said vent, a piston in said cylinder, and means secured to said piston engaging said member, said piston moving from a first position to a second position in response to a buildup of pressure in said cylinder, said piston in its said second position causing said member to move to its said other position, said biasing means moving said member back to its said one position and said member moving said piston back to its said first position when said vent is opened.

3. A step-by-step sequence control mechanism comprising: cam means; a ratchet secured in driving relation to said cam means; a pawl engageable with said ratchet; a movable member secured to said pawl, said pawl engaging and advancing said ratchet when said member is moved from a first position to a second position; means biasing said member to one of said positions; and means for alternately moving said member to the other of said positions and allowing said biasing means to return said member to said one position comprising a source of fluid under pressure, a cylinder, a conduit connecting said source and said cylinder, a vent for said fluid positioned to prevent pressure buildup in said cylinder when said vent is opened, means alternately opening and closing said vent, a piston in said cylinder, and means secured to said piston engaging said member, said piston moving from a first position to a second position in response to a buildup of pressure in said cylinder, said piston in its said second position causing said member to move to its said other position, said biasing means moving said member to its said one position and said member moving said piston back to its said first position when said vent is opened, said means alternately opening and closing said vent including a bimetal element movable to first and second positions, resistance coil means for heating said bimetal element, and an energizing circuit for said resistance coil means, said bimetal element opening said vent in one position and closing said vent in another position thereof, said bimetal element opening said resistance coil circuit in one position thereof and closing said resistance coil circuit in another position thereof.

References Cited in the file of this patent
UNITED STATES PATENTS

| | | |
|---|---|---|
| 2,077,744 | Cuno et al. | Apr. 20, 1937 |
| 2,630,181 | Solum | Mar. 3, 1953 |